MULTISTATE MEMORY CIRCUIT

Filed Nov. 28, 1962 2 Sheets-Sheet 1

| INPUT SIGNALS | | | | | | AND GATE OUTPUTS | | | | | | STATE OF CIRCUIT OR-I OUTPUTS | | | |
|---|---|---|---|---|---|---|---|---|---|---|---|---|---|---|---|
| A | B | C | D | E | F | 15 | 16 | 17 | 18 | 19 | 20 | 11 | 12 | 13 | 14 |
| 1 | 0 | 0 | 0 | 0 | 0 | 1 | 0 | 0 | 0 | 0 | 0 | 0 | 0 | 1 | 1 |
| 0 | 1 | 0 | 0 | 0 | 0 | 0 | 0 | 1 | 0 | 0 | 0 | 0 | 1 | 1 | 0 |
| 0 | 0 | 1 | 0 | 0 | 0 | 0 | 1 | 0 | 0 | 0 | 0 | 0 | 1 | 0 | 1 |
| 0 | 0 | 0 | 1 | 0 | 0 | 0 | 0 | 0 | 1 | 0 | 0 | 1 | 0 | 0 | 1 |
| 0 | 0 | 0 | 0 | 1 | 0 | 0 | 0 | 0 | 0 | 1 | 0 | 1 | 0 | 1 | 0 |
| 0 | 0 | 0 | 0 | 0 | 1 | 0 | 0 | 0 | 0 | 0 | 1 | 1 | 1 | 0 | 0 |

INVENTOR
ALLAN L. SCHERR

BY John F. Ostendorf
ATTORNEY

May 17, 1966 A. L. SCHERR 3,252,004

MULTISTATE MEMORY CIRCUIT

Filed Nov. 28, 1962 2 Sheets-Sheet 2

3,252,004

MULTISTATE MEMORY CIRCUIT

Allan L. Scherr, Boston, Mass., assignor to International Business Machines Corporation, New York, N.Y., a corporation of New York Filed Nov. 28, 1962, Ser. No. 240,572
10 Claims. (Cl. 307—88.5)

This invention relates to digital computer memory apparatus and, more particularly, to circuitry for storing a multiple number of states of information.

Circuitry for providing multiple state memory for information has been developed along two distinct paths. For example, the effort exercised along one path has concentrated on minimizing the number of levels of logic to be performed in the circuitry thereby enhancing the speed capabilities of the memory. On the other hand, efforts have also been directed at limiting the total number of components necessary for performing the storage function. In each instance, the resulting circuitry has required at least one active signal translating device for each state of information stored. As a result, consideration has not been given to reduction in the over-all cost of a storage unit by developing circuits based on the comparative costs of components, i.e., the more expensive cost of an active device, such as a transistor, as opposed to the cost of a passive device, such as logic performing semiconductor diodes.

Accordingly, it is a primary object of the invention to provide logical circuitry operable as a memory or latch to store a multiple number of states of information.

It is another object of the invention to provide multiple state memory circuitry employing a minimum number of active signal translating devices when compared with conventional memory circuitry storing an equivalent number of states of information.

Another object of the invention is to implement a multistate memory circuit by maximizing the number of passive components utilized and by minimizing the number of active components employed.

It is a further object of the invention to apply coding techniques to logical circuitry to provide memory for a multiple number of states of information.

A more specific object of the invention is to apply an $m$ out of $n$ coding scheme to sequential logical circuitry to minimize the number of active signal translating devices necessary for storing a multiple number of states of information.

In accordance with an aspect of the invention, there is provided circuitry for storing a multiple number of states of information by employing an $m$ out of $n$ code. In this code, $n$ is an integer equal to or greater than four and equivalent to the number of active signal translating devices necessary to store $n!/m!(n-m)!$ states of information. Also, $m$ is an integer and for the optimum condition $m=n/2$ when $n$ is an even integer and $$m=n/2\pm\frac{1}{2}$$

when $n$ is an odd integer. A composite manifestation of the state of information stored is provided by the signal levels at the outputs of a group of $n$ logical gates in response to the levels of the $n!/m!(n-m)!$ input signals supplied to each of these gates. A total of $$(n-1)!/(m-1)!(n-m)!$$

of these input signals result from coded combinations of the circuit input signals. The remaining $$(n-m)!/m!(n-1-m)!$$

input signals for each gate result from the logically combined outputs of the logical gates. Logical combining of the output signals is accomplished in a second group of logical gates. Each of the second groups of gates receives a different $m$ number of the $n$ output signals, and supplies input signals to the first group of logical gates according to the particular $m$ out of $n$ code employed. Depending on the circuit input signal which is changed in level, the circuitry stores one of the information states.

A feature of the invention requires that an input signal provided to any of the logical gates producing a circuit output signal cannot be a function of this output signal.

Another feature of the invention provides for the use of only one signal translating device in each of a first group of logical gates.

Still another feature of the invention provides for the minimization of the number of logical gates employing transistors by providing each transistor with the OR of the AND of each group of the other transistor outputs.

A further feature of the invention provides for each circuit input signal to be bilevel in nature and thereby indicative of the presence and absence of information, respectively. The circuit is arranged such that only one of these signals can be changed from a non-information state to an information state at a time to keep the circuit in a stable state of operation.

The foregoing and other objects, features and advantages of the invention will be apparent from the following more particular description of the preferred embodiments of the invention, as illustrated in the accompanying drawings; wherein.

As already indicated, the objects of the invention are carried out by utilizing an $m$ out of $n$ coding scheme with sequential logic circuitry. Improvement over prior art circuits takes place when $n$, which is an integer, is equal to or greater than four. Also, $m$ is an integer which is less than the value of $n$. For the optimum condition, when $n$ is an even integer, $m$ is equal to $n/2$ and when $n$ is an odd integer, $m$ is equal to $n/2\pm\frac{1}{2}$. It will become more apparent from the description which follows hereinafter that a memory circuit utilizing this code can store $n!/m!(n-m)!$ states of information while employing only $n$ active signal translating devices.

Figures 1, 2:
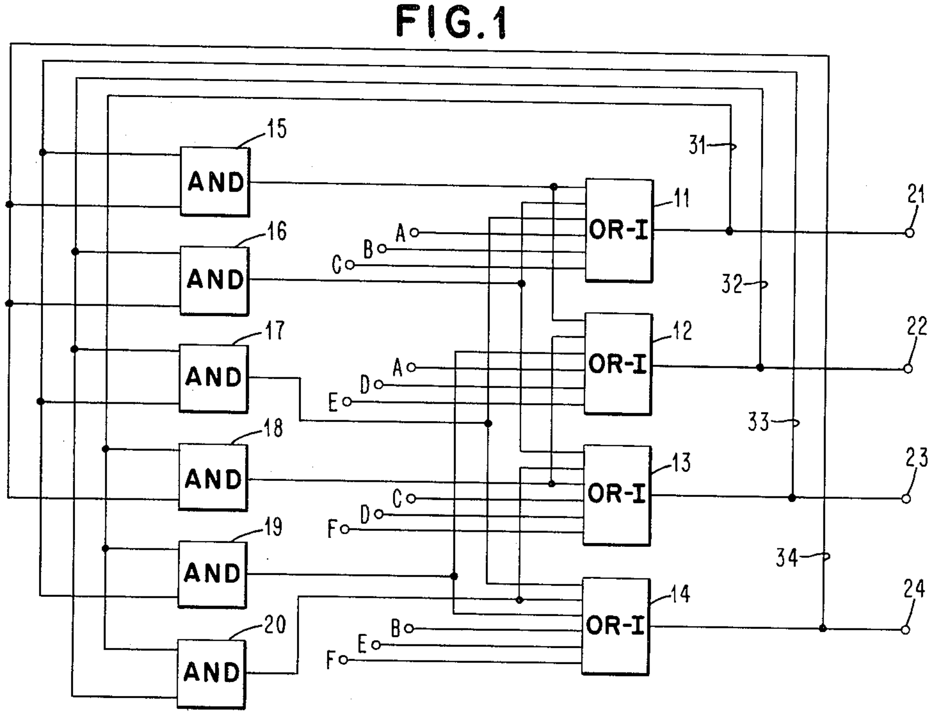
FIGURE 1 is a schematic circuit diagram of one preferred embodiment of a memory circuit embodying the principles of the invention and employing a two out of four code.
FIGURE 2 is a table showing the states of the circuit of FIGURE 1 as manifested by the composite output signal provided in response to the particular inputs; and, FIGURE 3 is a schematic circuit diagram of a second embodiment of a memory circuit embodying the principles of the invention and employing a two out of five code.

Referring now to FIGURE 1, a preferred embodiment of the invention employs a two out of four code and stores six states of information. It comprises OR-INVERT logical gates 11–14. Each gate 11–14 is provided with an input circuit having a plurality of terminals equal in number to the number of states of information that are stored in the circuit, i.e., a total of six terminals. Also, circuit input signals equal in number to the information states, i.e., six, are supplied to the circuit.

Each OR-INVERT gate receives three of the circuit input signals at its input terminals according to a preselected pattern. The remaining three terminals of each gate 11–14 are supplied additional signals according to another preselected pattern from a plurality of AND logical gates 15–20. For ease of understanding, these additional signals are referred to throughout the remainder of this specification as feedback input signals for the OR-INVERT gates. In each instance, the preselected pattern is determined by the two out of four code chosen for the circuit.

It should be understood that the gates utilized in the circuit are conventional in nature and may employ semiconductor diodes for performing the AND and OR logic. Transistors may be employed as the signal translating devices for accomplishing the signal inversion. Although these componets may be utilized, it is readily apparent that they have been chosen merely by way of illustration and do not constitute a limitation of the invention. Hence, other types of logical circuitry and signal inverters may be employed for carrying out the principles of the invention.

Each of the OR-INVERT logical gates 11–14 provides an output signal at respective ones of the output terminals 211–24. As will be more apparent from the description which follows, the composite output at all of the terminals 21–24 is indicative of the information state stored in the circuit. In addition, each of these output terminals is connected through feedback connections 31–34, respectively, to certain of the AND gates 15–20.

Each AND gate 15–20 receives an *m* number of the *n* output signals, i.e., for the embodiment of FIGURE 1, it receives two of the four output signals. Since a two out of four code is employed, a total of six AND gates is required to produce the logical product of all possible combinations of two feedback signals.

Each AND gate provides a signal which is applied to certain of the OR-INVERT gates. As already indicated, these signals are referred to as feedback input signals for the gates 11–14. The number of OR-INVERT gates supplied with any one feedback signal in *n-m*, i.e., two for the circuit of FIGURE 1. Moreover, it is a requirement of the invention that an AND gate can feed only those OR-INVERT gates which do not provide an input signal to the same AND gate. Thus, with reference to FIGURE 1, the signal from AND gate 15 is a function of the output signals of OR-INVERT gates 13 and 14. The feedback signal from this AND gate is supplied, in turn, as an input signal to gates 11 and 12. Similarly, the signal from AND gate 17 is supplied as an input signal to the OR-INVERT gates 11 and 14. The input signals to AND gate 17 are the output signals provided through the connections 32 and 33 from the gates 12 and 13. In similar manner, each of the other AND gates 16 and 18–20 provides a feedback signal which is supplied to the OR-INVERT gates that do not supply one of its input signals.

The circuit input signals supplied to each OR-INVERT gate 11–14 are determined by the code utilized in the circuit. For example, in this embodiment of the invention where the two out of four code is employed, there are six possible combinations for each two of the four OR-INVERT gates. Also, there are six input signals A, B, C, D, E and F supplied to the circuit. Each signal is applied to two of the four OR-INVERT gates as indicated in the following table:

| Gate combination: | Input signals |
|---|---|
| 11–12 | A |
| 11–14 | B |
| 11–13 | C |
| 12–13 | D |
| 12–14 | E |
| 13–14 | F |

Thus, as shown in FIGURE 1, input signal A, for example, is applied to gates 11 and 12, input signal B is applied to gates 11 and 14, input signal C is applied to gates 11 and 13, etc.

With reference to FIGURE 2, the state of the information stored in the circuit is manifested by the levels of the output signals provided by the gates 11–14. These levels are determined, in turn, by the levels of the six circuit input signals A–F. Therefore, if the input and output signals are bilevel and the conventional binary designation is applied to them, a binary "1" indicates an information state and a binary "0" a non-information state.

In the operation of the circuit, only one of the six circuit input signals can be in an information state at a time. If more than one input signal is in an information state, or, if more than one input signal changes from a non-information state to an information state at the same time, then the circuit is in an unstable mode of operation. As shown in FIGURE 2, if the A input signal is a binary "1" and the other input signals are binary "0," then the state of the circuit is indicated as 0011, i.e., the gates 11 and 12 each provide a binary "0" output signal and the gates 13 and 14 each provide a binary "1" signal.

As already noted, these signals are coupled through the feedback connections 31–34 to the AND gates 15–20. The AND gates 16, 17, 18 and 19 each receive one input signal that is a binary "0" and the other input signal is a binary "1." The AND gate 20 receives two binary "0" input signals. Therefore, as shown in FIGURE 2, all of these gates 16–20 provide binary "0" signals for coupling to respective ones of the OR-INVERT gates 11–14. On the other hand, the AND gate 15 receives the output signals provided by the OR-INVERT gates 13 and 14 through the feedback connections 33 and 34. This gate provides a binary "1" signal for application to the OR-INVERT gates 11 and 12. Thus, each of the OR-INVERT gates 11 and 12 receives at least one binary "1" input signal which is sufficient to cause these gates to provide a binary "0" output signal.

The OR-INVERT gates 13 and 14 each receive feedback input signals from the AND gates and circuit input signals which are all binary "0" causing them to provide the binary "1" output signals. Consequently, the A circuit input signal may be brought to its original or binary "0" level, and the circuit is latched and will continue to store the 0011 state of information.

The state of information stored in a circuit can only be changed by changing the level of one of the input signals from the binary "0" level to the binary "1" level. Thus, if it is desired to change the circuit from the 0011 state, it may be accomplished by returning the A input signal to the binary "0" level and by changing one of the other circuit input signals from the binary "0" to the binary "1" level. For example, if the D input signal is changed to the binary "1" level, then the gates 12 and 13 provide binary "0" output signals at the terminals 22 and 23, respectively. The gate 14 provides a binary "1" output at the terminal 24. Until the output signals from the gates 12–14 are coupled to the AND gates 15–20 through the feedback connections 31–34, the gate 11 provides a binary "0" output because the AND gate 15 is providing a binary "1" signal. When gate 15 receives a binary "1" signal from gate 14 and a binary "0" signal from gate 13, it provides a binary "0" signal which is supplied to the gates 11 and 12. The gate 11, therefore, produces a binary "1" output at the terminal 21 and the circuit assumes a stable state manifested at the output terminals as 1001. In similar manner, it may be demonstrated how the information state of the circuit may assume any of the six possible states.

In formulating the requirements for a generalized latch or memory circuit employing an *m* out of *n* code to store $n!/m!(n-m)!$ states of information, it is obvious that only *n* active signal translating devices are required. It is also apparent that each of the circuit input signals supplied to an OR-INVERT gate cannot be a function of the output signal of that gate. Thus, one requirement of the invention provides that no inverter may feed an AND gate feeding its OR gate. In addition, each AND gate receives *m* input signals through feedback connections from the *n* output signals of the OR-INVERT gates. Each AND gate is coupled to $n-m$ OR-INVERT gates.

A further requirement of the invention provides that each OR-INVERT gate has a total of $n!/m!(n-m)!$ feedback and circuit input signals supplied to it. As is obvious, this is equivalent to the number of states of information that may be stored by the circuit. Each OR gate receives $(n-1)!/(m-1)!(n-m)!$ input signals from the circuit input signals and $(n-1)!/m!(n-m-1)!$ feedback input signals from the AND gates.

From these requirements, it is obvious that multistate memory circuits may be implemented which are substantially less expensive than conventional circuits when five or more states of information are stored.

Thus, it is apparent that as the number of stable states of information to be stored in the memory apparatus increases, the ratio of stable states of information stored per inverter also increases. This relationship is shown in the table below comparing the number of inverters required for storing a given number of stable states.

| Number of Inverters | Number of Stable States | Stable States/ Inverter |
|---|---|---|
| 2 | 2 | 1 |
| 3 | 3 | 1 |
| 4 | 4 to 6 | 1.0 to 1.5 |
| 5 | 7 to 10 | 1.4 to 2.0 |
| 6 | 11 to 20 | 1.83 to 3.33 |
| 7 | 21 to 35 | 3.0 to 5.0 |
| 8 | 36 to 70 | 4.5 to 8.75 |
| 9 | 71 to 126 | 7.89 to 14.0 |
| 10 | 127 to 252 | 12.7 to 25.2 |

Figure 3:
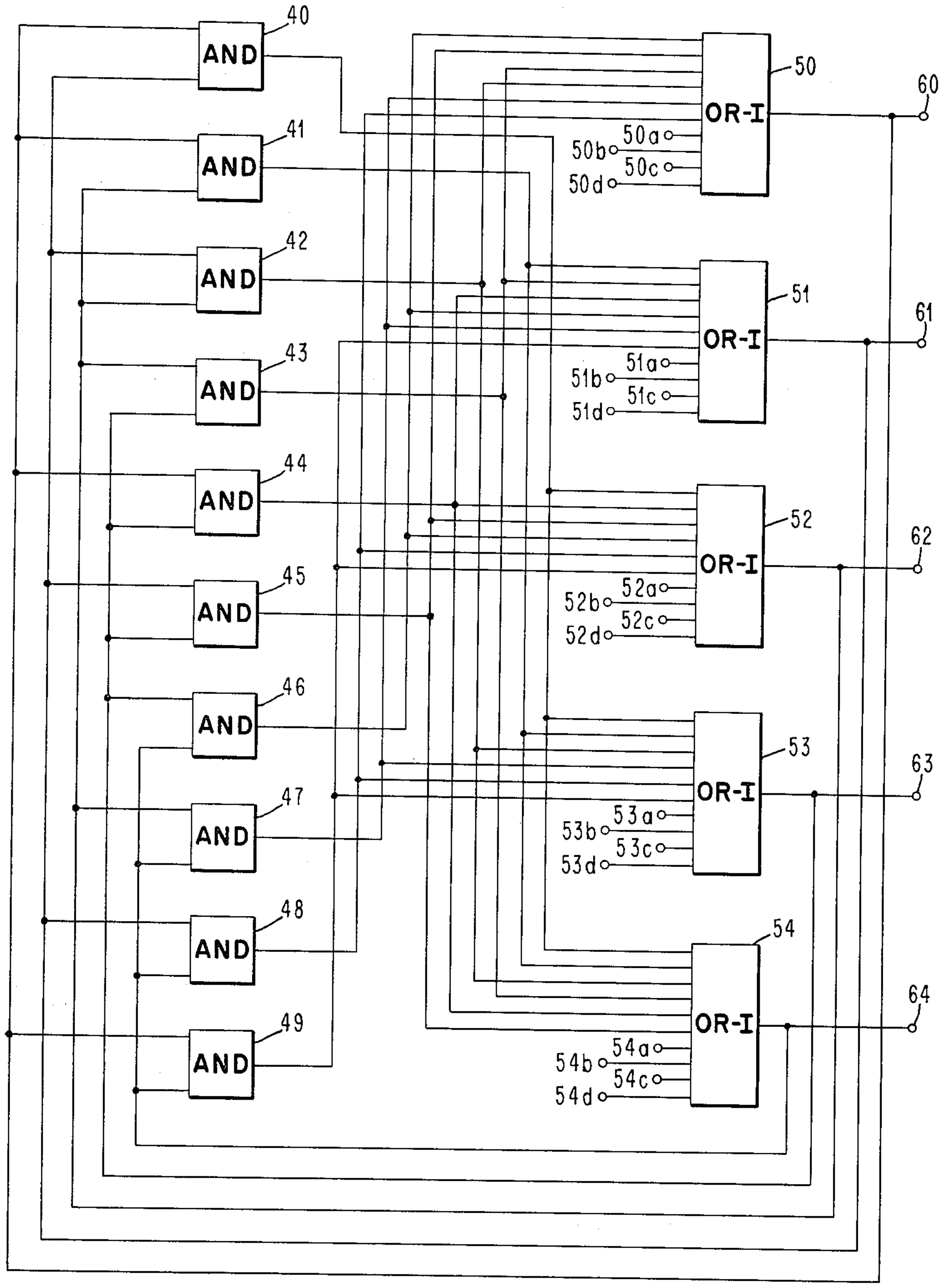

To further illustrate the principles of the invention, reference may be made to FIGURE 3, wherein a two out of five code is employed to store ten states of information. Such a circuit would be particularly advantageous in storing decimal information.

In the memory circuit of FIGURE 3, each AND gate 40–49 receives an $m$ number of inputs, i.e., two inputs, and the number of AND gates is equal to the number of information states, i.e., ten. Each OR-INVERT gate 50–54 receives $(n-1)!/m!(n-1-m)!$ or six input signals from the feedback signals of the AND gates 40–49. Thus, each AND gate feeds $n-m$ OR-INVERT gates, i.e., three gates. The remaining $(n-1)!/(m-1)!(n-m)!$ input signals for each OR-INVERT gate are supplied from the $n!/n!(n-m)!$ circuit input signals. In the circuit of FIGURE 3, four such signals are supplied to each OR-INVERT gate, for example, at the terminals 50$a$–50$d$, 51$a$–51$d$, etc.

The circuit of FIGURE 3 operates in a manner substantially the same as described for the circuit of FIGURE 1. The connections between the groups of gates are made in accordance with the requirements given above permitting the circuit to respond at any one time to one circuit input signal. Each of the OR-INVERT gates 50–54 includes an active signal translating device and provides an output signal at the terminals 60–64, respectively. This composite output signal manifests the state of information stored in response to any one circuit input signal.

While this invention has been particularly shown and described with reference to a preferred embodiment thereof, it will be understood by those skilled in the art that the foregoing and other changes in form and details may be made therein without departing from the spirit and cope of the invention. For example, the invention has been described using logical gates in an AND-OR-INVERT configuration. It is readily apparent that the invention is not restricted to this configuration, but also extends to an OR-AND-INVERT configuration of logical gates. In such a case, appropriate changes would be made in the levels of the signals applied to the gates so that the circuit would be latched into an information state in response to the application of a binary "0" to a particular AND-INVERT gate.

What is claimed is:

1. Circuitry for storing $n!/m!(n-m)!$ states of information in response to an equivalent number of bilevel circuit input signals, each of said states being manifested by the levels of $n$ bilevel output signals, wherein $n$ is an integer equal to or greater than four and $m$ is an integer less than $n$, comprising

- a first group of combinatorial logical gates equal in number to $n$, each gate providing one of said output signals in response to $n!/m!(n-m)!$ gate input signals, $(n-1)!(m-1)!(n-m)!$ of the gate input signals being provided from said circuit input signals,
- a second group of combinatorial logical gates equal in number to $n!/m!(n-m)!$ each of the second group of gates receiving a different $m$ of the $n$ output signals to provide a feedback input signal,
- and means for applying said feedback input signals to the first group of gates enabling $$(n-1)!/m!(n-m-1)!$$

of the input signals for each of the first group of gates to be supplied from said second group of gates.

2. The circuitry of claim 1, where $m$ is equal to $n/2$ when $n$ is an even integer and $m$ is equal to $n/2\pm½$ when $n$ is an odd integer and each one of the feedback input signals is applied to an $n-m$ number of the first group of gates, said feedback signals being supplied only to those gates of the first group whose output signals do not determine its signal being supplied.

3. The circuitry of claim 2, wherein each of the first group of logical gates is a two-stage logical circuit including a signal translating means.

4. The circuitry of claim 2, wherein each of the second group of logical gates provides the logical product of a different $m$ of the $n$ output signals.

5. The circuitry of claim 2, wherein each of the first group of logical gates provides the complemented logical sum of the $n!/m!(n-m)!$ input signals supplied to it.

6. An information storage circuit employing an $m$ out of $n$ code, wherein $n$ is an integer equal to or greater than four and $m$ is equal to $n/2$ when $n$ is an even integer and $n/2\pm½$ when $n$ is an odd integer, comprising

- an input circuit for supplying $n!/m!(n-m)!$ circuit input signals,
- an output circuit for providing $n$ output signals, the combined manifestation of the output signals at said output circuit being indicative of the state of information stored in the circuit,
- a first group of combinatorial logical gates equal to $n$,
- each of the gates providing one of the output signals at said output circuit in response to $n!/m!(n-m)!$ input signals supplied to each of the first group of gates,
- $(n-1)!/(m-1)!(n-m)!$ of the signals applied to each of the first group of gates being supplied from the input circuit according to the $m$ out of $n$ code utilized in the circuit,
- a second group of combinatorial logical gates equal in number to $n!/m!(n-m)!$
- each of the second group of logical gates being responsive to a different $m$ of the $n$ output signals to provide a feedback signal,
- and means coupling each of the second group of logical gates to an $n-m$ number of the first group of gates, so that $(n-1)!/m!(n-m-1)!$ of the input signals supplied to each of the first group of gates are supplied as feedback input signals from the second group of logical gates.

7. The circuitry of claim 6, wherein each of the second group of logical gates provides the logical product of a different $m$ of the $n$ output signals.

8. The circuitry of claim 6, wherein each of the first group of logical gates provides the complemented logical sum of the $n!/m!(n-m)!$ input signals supplied to it.

9. The circuitry of claim 6, wherein each of the second group of logical gates provides the logical sum of a different *m* of the *n* output signals.

10. The circuitry of claim 6, wherein each of the first group of logical gates provides the complemented logical product of the $n!/m!(n-m)!$ input signals supplied to it.

References Cited by the Examiner

UNITED STATES PATENTS 3,178,590 4/1965 Heilweil et al. ------ 307—88.5

ROBERT C. BAILEY, *Primary Examiner.*

M. LISS, *Assistant Examiner.*